No. 698,618. Patented Apr. 29, 1902.
J. ANDERSON.
GEAR MOLDING APPARATUS.
(Application filed Oct. 29, 1901.)
(No Model.) 3 Sheets—Sheet 1.
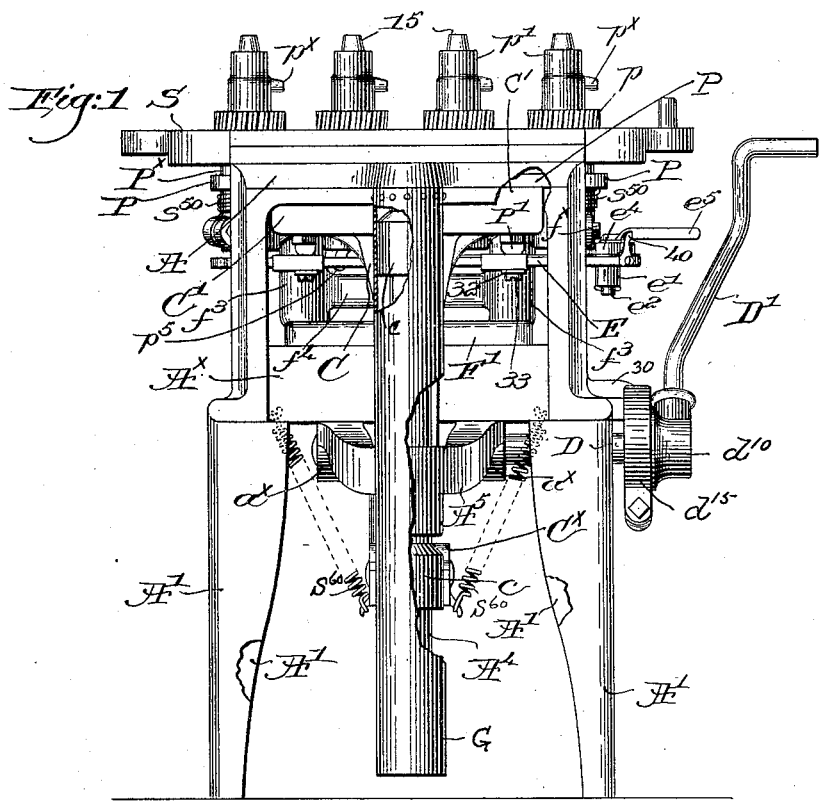
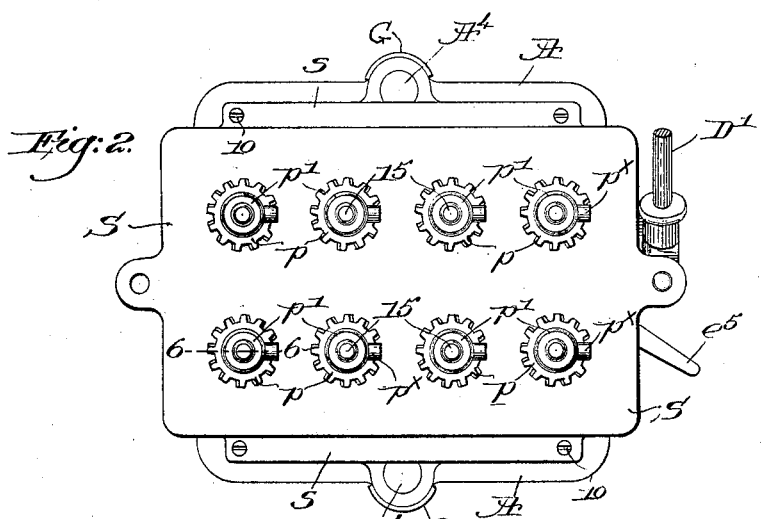

No. 698,618. Patented Apr. 29, 1902.
J. ANDERSON.
GEAR MOLDING APPARATUS.
(Application filed Oct. 29, 1901.)
(No Model.) 3 Sheets—Sheet 2.
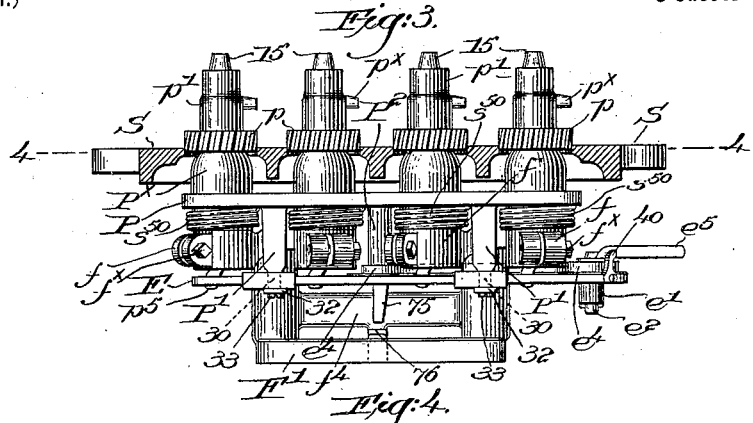
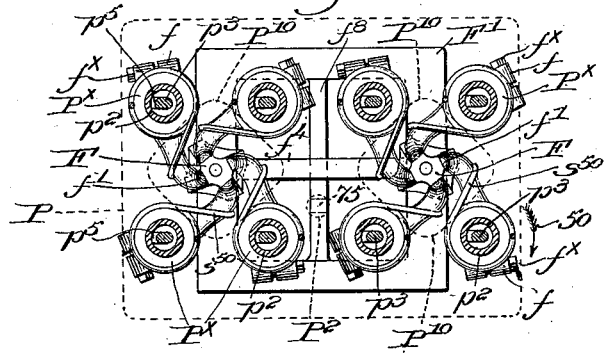
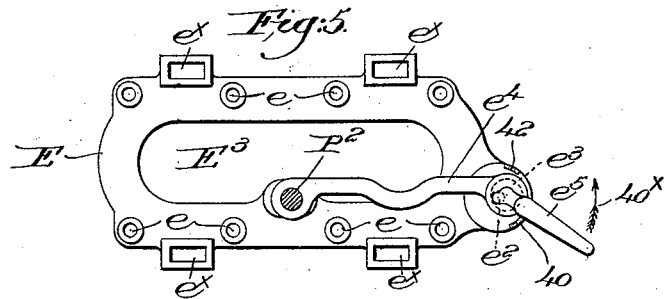
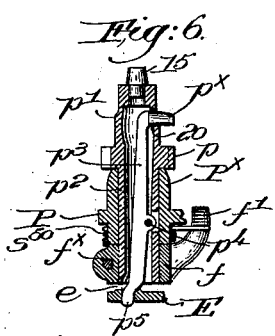
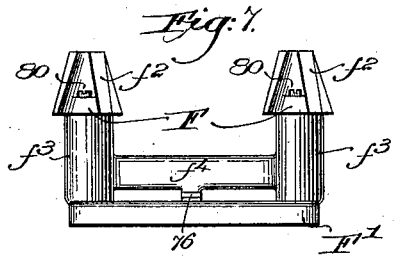
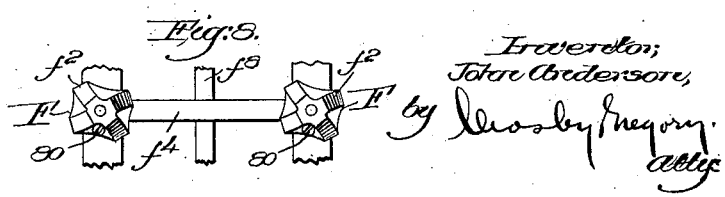
Witnesses,
Edward F. Allen.
W. C. Lunsford
Inventor;
John Anderson,
by Crosby Gregory
Attys No. 698,618. Patented Apr. 29, 1902.
J. ANDERSON.
GEAR MOLDING APPARATUS.
(Application filed Oct. 29, 1901.)
(No Model.) 3 Sheets—Sheet 3.
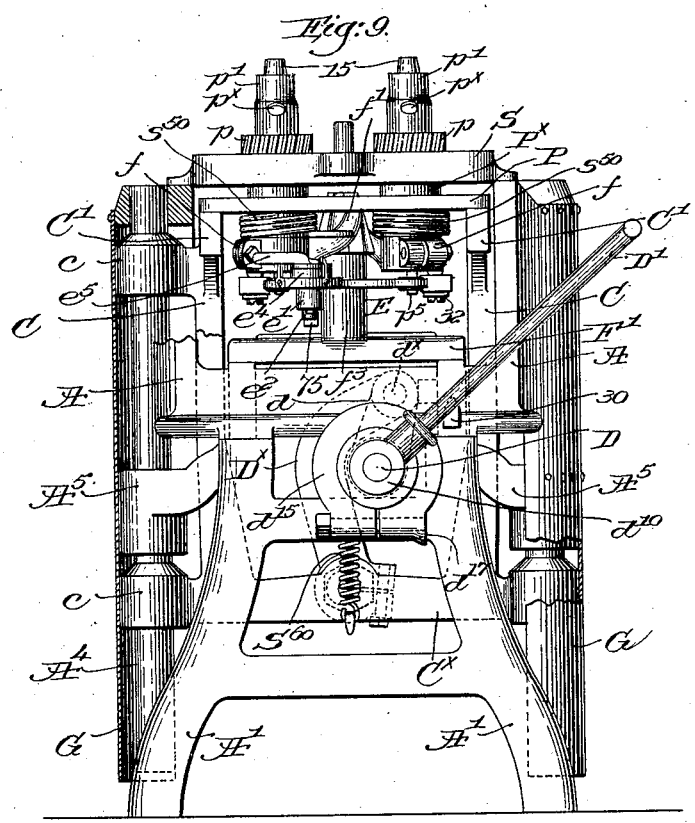
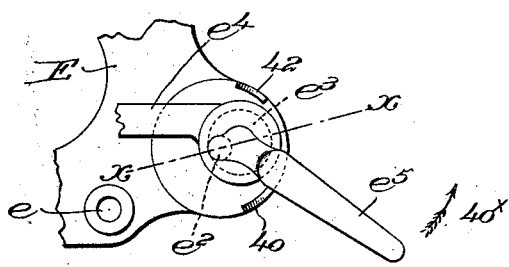
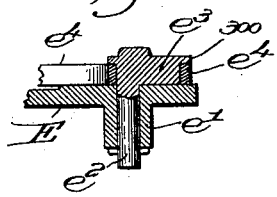
Witnesses,
Edward G. Allen
Thomas J. Drummond
Inventor,
John Anderson,
by Dinsley Gregory
attys

UNITED STATES PATENT OFFICE.

JOHN ANDERSON, OF HOPEDALE, MASSACHUSETTS, ASSIGNOR TO DRAPER COMPANY, OF HOPEDALE, MASSACHUSETTS, A CORPORATION OF MAINE.

GEAR-MOLDING APPARATUS.

SPECIFICATION forming part of Letters Patent No. 698,618, dated April 29, 1902.

Application filed October 29, 1901. Serial No. 80,417. (No model.)

*To all whom it may concern:*

Be it known that I, JOHN ANDERSON, a citizen of the United States, and a resident of Hopedale, county of Worcester, State of Massachusetts, have invented an Improvement in Gear-Molding Apparatus, of which the following description, in connection with the accompanying drawings, is a specification, like characters on the drawings representing like parts.

This invention has for its object the production of a novel and effective apparatus for making molds for cast-metal gears, and more particularly spiral or worm gears, whereby the time and labor required for the construction of such molds are greatly reduced and the accuracy of the mold itself materially increased.

Practical molders are familiar with what is technically termed "picking in"—that is, the delicate operation of drawing into or within the external face of a pattern a movable part, which projects laterally to the path of the pattern when "drawn" during the ramming of the sand. This picking in requires skill, delicacy, and time, and often a mold will be spoiled because of careless or faulty work in this particular. In my present invention I have also provided means for automatically picking in a laterally-projecting portion of the pattern, so that the invention may be practiced by unskilled labor and with all of the best results flowing from the use of highly-skilled labor and none of the objections.

Various novel features of my invention will be hereinafter described in the specification and particularly pointed out in the following claims.

Figure 1 is a front elevation, partly broken out, of a molding apparatus containing one embodiment of my invention, the pattern being shown in position for the construction of the mold. Fig. 2 is a top or plan view of the apparatus shown in Fig. 1, the operating-handle being cut off. Fig. 3 is a front elevation of the pattern-carrier, a group of patterns mounted thereon, and coöperating mechanism removed from the main frame of the apparatus and with the stripper-plate in section. Fig. 4 is a horizontal detail on the line 4 4, Fig. 3, looking down, the pattern-carrier being indicated by dotted lines and the stripper-plate omitted. Fig. 5 is a top or plan view of the picking-in actuator detached. Fig. 6 is a vertical sectional detail through the vertical axis of one of the patterns on the line 6 6, Fig. 2. Fig. 7 is a front elevation of the means for governing the rotative movement of the pattern when it is drawn. Fig. 8 is a top or plan view of such means. Fig. 9 is a right-hand end elevation of the apparatus shown in Fig. 1, the frame being partly broken out. Fig. 10 is an enlarged plan view of the devices shown at the right-hand end of Fig. 5; and Fig. 11 is a sectional detail on the line *x x*, Fig. 10, to be referred to.

The molding apparatus in which my present invention is embodied pertains to apparatus of the class wherein the parting-face of the mold is made by a fixed stripper-plate, which also supports the flask during the construction of the mold, the pattern being movable relatively to the stripper-plate and coöperating therewith, the said plate having an opening or openings through which the pattern projects when in operative position.

I have herein shown an apparatus for molding, wherein a plurality of like patterns are used with one stripper-plate, means being provided for imparting the same movement to all of the patterns simultaneously to draw them from the mold or to position them operatively with relation to the stripper-plate; but my invention is equally adapted to single molding, if desired, as will be more clearly manifest from the detailed description hereinafter.

It will be manifest that in order to "draw" the pattern for a spiral or worm gear from the mold a compound movement must be imparted thereto, the movement axially of the pattern being accompanied by a rotative movement, to the end that the pattern will leave the sand mold intact, and I have provided novel and simple means herein for automatically effecting such movement of the pattern.

The mechanism for moving the carrier for the pattern or patterns is not herein shown or described in detail, as the same forms no part of this present invention.

Referring to Figs. 1 and 9, the operative parts of the apparatus are supported by a rigid heavy frame comprising upright front and back portions A A, (see Figs. 2 and 9,) connected by a base-piece A$^\times$ and mounted on legs A' of a height to sustain the stripper-plate at a convenient height for work, four of such legs being shown in Fig. 1, located at the corners of the frame, said legs being connected in pairs at the ends of the frame, as shown in Fig. 9. A horizontal operating-shaft D is supported in bearings $a^\times$, depending from the base-piece A$^\times$, said shaft having connected therewith at one side of the apparatus by a hub $d^{10}$ a suitable actuating-handle D', by which the molder operates the pattern-carrier, to be described. A split collar $d^{15}$ is clamped on the hub and is shouldered at $d^{17}$, Fig. 9, to engage a stop-lug 30, Figs. 1 and 9, on the frame to limit the downward movement of the pattern-carrier when the handle $d'$ is swung to the front of the apparatus. Depending cylindrical guides A$^4$ are secured to the front and back of the frame, externally thereto, and are supported between their ends by brackets A$^5$, which extend outward from the base-piece A$^\times$.

The pattern-carrier comprises two upright parallel arms C, one of which is shown in part in Fig. 1, each having two hubs $c\ c'$ to embrace and slide upon one of the guides A$^4$, said arms being connected at their lower ends by a cross-bar C$^\times$, (see Fig. 9,) and any suitable connections are provided between it and the shaft D, whereby rotative movement of the latter in one or the other direction will raise or lower the connected arms, which are outside of the base-piece A$^\times$. Referring to Fig. 9, such connection is shown as a link D$^\times$, pivotally connected at its lower end with the cross-bar C$^\times$ and at its upper end pivoted at $d^\times$ to a crank $d$, fast on the shaft D. When the shaft D is turned by swinging the handle D' to the left, Fig. 9, the link D$^\times$ is moved forward and downward to thereby depress the pattern-carrier, suitable springs S$^{60}$, Figs. 1 and 9, connected at their ends to the frame and to the cross-bar C$^\times$ of the pattern-carrier, serving to assist the operator in raising the pattern-carrier into the position shown in Figs. 1 and 9. Sheet-metal guards G, secured to and depending from the upper part of the frame, partly surround the guides A$^4$ and the hubs $c\ c'$ of the pattern-carrier, protecting the same from the entrance of sand and dirt. The pattern-carrier is thus essentially U-shaped when viewed from either side of the apparatus, the tops of the arms being laterally extended to form heads C', on which the pattern-plate is supported. (See Figs. 1 and 9.)

A rectangular stripper-plate S, Fig. 2, is shown as provided with extensions $s$ at its front and back edges to rest upon the horizontal top of the portion A of the main frame, securely held in place by suitable screws 10, so that the said stripper-plate is firmly sustained and serves as a support for the flask when the mold is being constructed, the plate being recessed on its under side (see Fig. 3) to provide for the requisite movement of the pattern and also to present a relatively thin edge surrounding the pattern-opening. I have herein shown the apparatus arranged with eight like patterns in two groups of four each, as shown in Fig. 2, and there will of course be an opening in the stripper-plate for each pattern, a drag containing eight molds being thus constructed at one operation, though it will clearly appear hereinafter that the number of patterns used with the stripper-plate may be changed without departing from my invention. The article to be cast in the mold made by the pattern shown is a spiral or worm gear having an attached hub, the latter being provided with a radial projection or lug, and each pattern accordingly comprises a gear portion $p$, an attached hub portion $p'$, and a lug-print $p^\times$ radially extended beyond the hub portion when the mold is being constructed.

A pattern-plate P rests upon and is secured to the heads C' of the pattern-carrier below the stripper-plate and in parallelism with the upper face thereof, the pattern-plate having a series of tubular upright bearings P$^\times$, which project above and below the plate (see Fig. 6) surrounding circular openings therein, said bearings receiving and supporting the long hollow tubular shanks $p^2$, which are herein shown as forming continuations of the hollow hub portion $p'$ of the patterns.

A core-print 15 is mounted on the upper end of each pattern to form in the sand of the mold a seat or socket for the core, which will be a part of the cope, the latter usually being constructed on a "flat back."

The "lug-print" $p^\times$, as I have termed the part of the pattern for forming the lateral print in the mold, is secured to or forms a part of a carrier $p^3$ within the hub and shank of the pattern and fulcrumed at $p^4$, the print $p^\times$ being movable in and out through a hole 20 in the wall of the part $p'$ when the carrier is rocked on its fulcrum by means to be described, the withdrawal of the print into the hub being effected mechanically before the pattern is drawn.

The pattern-plate has depending from its under side a series of posts P', four being used in the present instance, the lower ends of said posts being reduced in thickness, as at 30, (see dotted lines, Fig. 3,) to enter elongated sockets $e^\times$, formed in a skeleton plate E, (shown in plan view, Fig. 5,) washers 32 being secured to the lower ends of the posts P' beneath the plate E by means of suitable screws 33, so that the plate may be moved longitudinally in one or the other direction on the reduced portions of the posts, said plate E being supported on the latter by means of the washers 32. This plate E has a series of sockets or holes $e$ therein corresponding in number to the number of patterns to be used, each socket being adapted to receive the depending and offset end $p^5$ of one of the carriers $p^3$, as shown clearly in Fig. 6. Referring to Fig. 6 it will be noted that when the lug-print $p^\times$ is in its projected position the offset $p^5$ at the lower end of the carrier will be eccentric to the center of the tubular shank $p^2$ of the pattern.

Referring to Figs. 1, 3, 5, and 11, the plate E has at the right-hand end, when viewed from the front of the machine, a depending hub $e'$, which forms a bearing for a stud $e^2$, provided at its upper end above the plate E with an eccentric head $e^3$, (see dotted lines, Figs. 5 and 10, and in section, Fig. 11,) which fits snugly in a circular opening in the end of the link $e^4$, the other end of the link being pivotally mounted on a post $P^2$, depending from the pattern-plate, the top of the head being extended over the top of the link, as at 300, Fig. 11, to prevent lifting of the link. A handle $e^5$ forms a part of the head $e^3$ of the stud $e^2$, and, referring to Figs. 5 and 10, it will be manifest that if this handle is swung in the direction of the arrow $40^\times$ the plate E will be moved to the right by the rotative movement of the eccentric head $e^3$, with the stud $e^2$ as its center, inasmuch as the inner or left-hand end of the link $e^4$ is fixedly positioned by the post $P^2$. Stops 40 and 42 on the plate E limit the movement of the handle $e^5$ in one or the other direction, and when the handle is swung over against the stop 42 the plate will then have been moved to the right (viewing Figs. 3, 5, and 10) far enough to swing each one of the lug-print carriers $p^3$ on its fulcrum to withdraw the lug-print $p^\times$ into the upper part of the hub portion of the pattern, and at the same time the offset extension $p^5$ will be brought into alinement with the vertical axis of the pattern, so that the latter may then be rotated.

Inasmuch as a part of the pattern in my present invention is a gear having spiral teeth, as shown at $p$, it will be manifest that when the pattern is drawn from the mold it is necessary not only to move the pattern downward relatively to the stripper-plate, but also to impart a rotative movement to the pattern, in correspondence with the pitch of the teeth of the gear portion. The openings in the stripper-plate through which the gear parts $p$ project when the mold is being constructed are toothed to coöperate exactly with the gear portion of the pattern, and the combined longitudinal and rotative movement of the pattern, hereinafter referred to, operates to screw out, as it were, the gear from the sand of the mold and through the corresponding hole in the stripper-plate.

Referring to Fig. 6, the lower end of the tubular shank $p^2$ projects below the lower end of the tubular guide $P^\times$ on the pattern-plate, and such projecting portion is embraced by the split hub $f$ of a laterally-extended and upturned guide-finger $f'$, the hub being clamped in place by a suitable clamp-screw, as $f^\times$.

Referring for a moment to Fig. 4, it will be noted that of the eight patterns herein shown the arrangement of the attached fingers $f'$ is such that the fingers of the four patterns at one end of the apparatus extend inward toward a common point, and the fingers of the other four patterns at the right-hand end of the machine also extend inward toward a second common central point.

The proper rotative movement of the patterns is transmitted to them through the fingers $f'$, which latter travel on the pitch-faces $f^2$ of a pair of directors F, (shown separately in side elevation, Fig. 7, and plan view, Fig. 8,) it being noted that each director has four pitch-faces $f^2$—one for each finger of the group of patterns surrounding it—the directors being so placed that their centers are equidistant from the centers of rotation of the four patterns, the rotative movement of which they control. These directors are detachably mounted on upturned standards $f^3$, rigidly connected by a cross-bar $f^4$ and mounted on a supporting-plate $F'$, which is sustained by the base-piece $A^\times$ of the frame. Each pitch-face $f^2$ of a director is shaped in accordance with the pitch of the teeth of the gear portion $p$ of the pattern, so that as the pattern is moved downward by the descent of the pattern-plate P it will also be given the proper amount of rotation by the finger $f'$, traveling upon the pitch-face, so that the proper spiral movement of the pattern is effected. Referring to Fig. 4, where the spiral fingers are shown at the upper ends of the pitch-faces, it will be manifest that as the directors F are stationary the downward movement of the pattern-plate will cause all of the fingers to be swung outward to thereby effect the rotative movement of the spiral patterns in their bearings $P^\times$ in the direction of the arrow 50, Fig. 4. The fingers are maintained in contact with the pitch-faces by springs $s^{50}$, which are coiled about the portions of the bearings $P^\times$ below the pattern-plate, as clearly shown in Fig. 3, and with their free ends bearing upon the fingers, the winding of each spring being such that its normal tendency is to rotate the pattern in a direction opposite to the arrow 50.

With the parts in the position shown in Figs. 1 to 4, inclusive, and Fig. 9, and in detail in Fig. 6 as relates to each individual pattern, the molder places the flask upon the stripper-plate S and proceeds to make the mold in the usual manner, throwing in sand and ramming it about the various parts of the spiral patterns. When the mold is completed, the handle $e^5$ is swung from its position (shown in Figs. 5 and 10) in the direction of the arrow $40^\times$ against the stop 42, such movement operating to simultaneously withdraw all of the lug-prints $p^\times$ from the sand of the mold, this operation being equivalent in its effect to the well-known hand operation of picking in, and then the operator, by means of the handle $D'$, turns the actuating-shaft D and lowers the pattern-carrier from the position shown in Figs. 1 and 9. It being remembered that the pattern-plate P is secured to the pattern-carrier, it follows that the pattern-plate will be lowered relatively to the stripper-plate S and the patterns mounted on such pattern-plate will be drawn from the mold, and by means of the fingers $f'$ and the pitch-faces $f^2$ of the directors the proper rotative movement will be imparted to the patterns, the downward movement being sufficient to completely draw the gear portions of the several patterns from the sand, after which the flask is lifted off, the pattern-plate returned to operative position by a reverse movement of the handle D', and then the handle $e^5$ is swung against the stop 40 to project the lug-prints into position for the operation of a new mold.

By the apparatus herein shown a number of patterns of the character specified can be made more rapidly and accurately than it has been possible heretofore to form a mold of a single pattern by hand and so, too, each one of the several molds produced in the one flask will have a lateral print, which forms a lug or projection on the complete casting. If no such lug is required, the handle $e^5$ will be kept against the stop 42, as thereby the offset portions $p^5$ of the several lug-print carriers are centralized with relation to their respective patterns.

By the employment of an apparatus embodying this invention unskilled labor can produce the same class of work as skilled labor can now produce by the hand methods of molding, and inasmuch as considerable injury to the apparatus would be produced by a full drawing movement without previously bringing the plate E into position to center the lug-print carriers I have provided means to prevent drawing movement of the pattern unless such centering is first effected. To this end I have provided a safety-stop 75, (see Fig. 3,) which depends from the plate E, and when the latter is in the position shown in Fig. 3 this safety-stop will be directly over and just above an abutment 76 on the cross-bar $f^8$ of the supporting-plate $f'$, so that if the drawing movement is attempted before moving the plate E to center the lower ends of the carriers $p^3$ the safety-stop will bring up against the abutment 76 and will prevent any further downward movement of the patterns. When, however, the handle $e^5$ is swung over against the stop 42, the movement of plate E to the right (viewing Fig. 5) will carry the safety-stop 75 to one side of the abutment 76, so that the drawing movement will not be interfered with thereafter. The central opening $E^3$ in the plate E permits the passage therethrough of the directors F, so that the several fingers $f'$ may coöperate therewith.

Referring to Fig. 7, the directors F are shown as held in place by screws 80, so that by substituting different directors having different pitch-faces the apparatus may be used for patterns the gear portions of which have different pitches for their teeth, the substitution of one pattern for another being readily effected by merely detaching the split hubs $f$ of the fingers from their respective pattern-shanks $p^2$, removing the pattern, substituting the new one, and reclamping the finger thereupon.

My invention is not restricted to the precise construction and arrangement herein shown and described nor to the particular number of patterns, as it will be manifest that different numbers of patterns may be used and various changes or modifications may be made in the construction and arrangement of the apparatus without departing from the spirit and scope of my invention.

As shown by dotted lines, Fig. 4, the pattern-plate has openings $P^{10}$ therein, through which the directors F and the fingers $f'$ pass and which provides for the necessary movement of the parts.

Having described my invention, what I claim as new, and desire to secure by Letters Patent, is—

1. In gear-molding apparatus, a fixed stripper-plate having a pattern-opening, a pattern-carrier movable toward and from the stripper-plate, means to effect such movement of the pattern-carrier, a pattern rotatably mounted on the pattern-carrier, and including a spiral gear portion, a lateral finger rigidly connected with the pattern, a fixed director having a pitch-face corresponding to the pitch of the gear, and means to yieldingly press the finger against the pitch-face, movement of the pattern to draw it from the mold acting, by coöperation of the finger and the director, to properly rotate said pattern.

2. In gear-molding apparatus, a fixed stripper-plate having a pattern-opening, a pattern-carrier movable toward and from the stripper-plate and having an upright tubular bearing, means to effect such movement of the pattern-carrier, a pattern having a tubular shank rotatably mounted in said bearing, a lateral finger secured to the shank below the bearing, a fixed director having a pitch-face over which the finger travels, to impart rotative movement to the pattern when moved longitudinally, and a spring to yieldingly press the finger against the pitch-face.

3. In gear-molding apparatus, a fixed stripper-plate having a plurality of pattern-openings, a plurality of coöperating and rotatably-mounted patterns bodily movable toward and from the stripper-plate and each having a spiral gear portion, means to effect such bodily movement of the patterns, a common fixed director symmetrically located relatively to the several patterns and having a like number of pitch-faces corresponding to the pitch of the gear portions, and laterally-extended fingers rigidly connected with the several patterns and at their inner ends engaging the several pitch-faces of the said director, whereby movement of the patterns longitudinally will, through the fingers and pitch-faces, rotate the patterns in correspondence with the pitch of the gear portions, to draw the same from the mold.

4. In gear-molding apparatus, a stripper-plate, a coöperating hollow pattern having a side opening, a pattern-plate in which the pattern is rotatably mounted, means to move the pattern-plate toward and from the stripper-plate, a lug-print carrier pivotally mounted within the pattern and having a lug-print thereon to extend through the side opening, the lower end of the carrier being offset from the axis of rotation of the pattern, means coöperating with said offset end to move the carrier to retract the lug-print and to centralize the offset end relatively to the axis of rotation of the pattern, and means to rotate the pattern, when it is moved longitudinally and bodily by movement of the pattern-plate.

5. In gear-molding apparatus, a stripper-plate, a coöperating hollow pattern, having a side opening, a pattern-plate in which the pattern is rotatably mounted, means to move the pattern-plate toward and from the stripper-plate, a lug-print carrier pivotally mounted within the pattern, and having a lug-print thereon to extend through the side opening, the lower end of the carrier being offset from the center of rotation of the pattern, means coöperating with the offset end and supported by the pattern-plate to centralize the lower end of the carrier with the axis of the pattern, and retract the lug-print, and means to automatically rotate the pattern when it is moved longitudinally.

6. In gear-molding apparatus, a fixed stripper-plate, a pattern-plate movable toward and from it, means to effect such movement of the pattern-plate, a pattern rotatably mounted on said pattern-plate and having a spiral gear portion and a hollow hub portion provided with a side opening, a lug-print carrier pivotally mounted within the hub portion and laterally offset at its lower end from the axis of rotation of said hub portion, a sliding, manually-operated actuator coöperating with the offset end of the carrier and supported by the pattern-plate, a lug-print on the carrier and adapted to extend laterally through the side opening in the hub portion of the pattern, means to automatically rotate the pattern when moved longitudinally, to thereby draw the spiral gear portion thereof, and means to prevent rotative movement of the pattern until the sliding actuator has been moved to retract the lug-print and to also centralize the offset end of the carrier.

In testimony whereof I have signed my name to this specification in the presence of two subscribing witnesses.

JOHN ANDERSON.

Witnesses:
I. L. WIGHT,
GEORGE OTIS DRAPER.